(12) United States Patent
Van Puijenbroek et al.

(10) Patent No.: US 10,342,388 B2
(45) Date of Patent: Jul. 9, 2019

(54) CONTAINER CONSTRUCTION FOR POWDERED MATERIAL

(71) Applicant: N.V. Nutricia, Zoetermeer (NL)

(72) Inventors: Alexander Josephus Maricus Van Puijenbroek, Den Bosch (NL); Patrick Michael Van Baal, Bussum (NL); Sjors Floris Crusius, Shanghai (CN); Priya Caroline Roberts, Amsterdam (NL); Benoit Marie Francois Piette, Brive (FR); Gary John Burdett, Amstelveen (NL)

(73) Assignee: N.V. Nutricia, Zoetermeer (NL)

( * ) Notice: Subject to any disclaimer, the term of this patent is extended or adjusted under 35 U.S.C. 154(b) by 450 days.

(21) Appl. No.: 14/647,184

(22) PCT Filed: Nov. 27, 2013

(86) PCT No.: PCT/NL2013/050856
§ 371 (c)(1),
(2) Date: May 26, 2015

(87) PCT Pub. No.: WO2014/084732
PCT Pub. Date: Jun. 5, 2014

(65) Prior Publication Data
US 2015/0297036 A1 Oct. 22, 2015

(30) Foreign Application Priority Data

Nov. 27, 2012 (WO) ................ PCT/NL2012/050843

(51) Int. Cl.
B65B 1/04 (2006.01)
B65B 7/28 (2006.01)
(Continued)

(52) U.S. Cl.
CPC ................ *A47J 47/04* (2013.01); *A23L 33/40* (2016.08); *B65B 1/04* (2013.01); *B65B 7/2842* (2013.01);
(Continued)

(58) Field of Classification Search
CPC .... B65D 81/3216; B65D 43/16; B65D 51/20; B65D 59/04; A47J 47/02; A47J 47/04; A23L 33/40
(Continued)

(56) References Cited

U.S. PATENT DOCUMENTS 4,736,870 A * 4/1988 Christensson ........... B65D 5/66
220/495.06
6,761,279 B1 7/2004 Martin et al.
(Continued)

FOREIGN PATENT DOCUMENTS

CN 104603018 5/2015
DE 69 19 071 U 8/1969
(Continued)

OTHER PUBLICATIONS

Schmalbach DE 69 19 071 (machine translation).*
(Continued)

*Primary Examiner* — Erik Kashnikow
*Assistant Examiner* — Lela S. Williams
(74) *Attorney, Agent, or Firm* — N.V. Nederlandsch Octrooibureau; Catherine A. Shultz; Tamara C. Stegmann

(57) ABSTRACT

A packaging for a powdered material includes a tub for receiving the material, the tub having a base and a peripheral wall with a top edge; an outer sleeve around at least the peripheral wall of the tub, thereby supporting the tub; a removable membrane for separating the powdered material in the tub from the environment; and a lid assembly having a peripheral rim for connection over the top edge of the (Continued)

peripheral wall of the tub and defining a wide access opening and a lid, hingedly attached to the rim for reclosing the access opening. A method of manufacturing such a package for a powdered material includes sliding the tub in the sleeve, such that at least the peripheral wall of the tub is enclosed by the sleeve, whereby sleeve supports the tub and the tub and sleeve form a container for the powdered material.

20 Claims, 2 Drawing Sheets

(51) Int. Cl.
*A23L 33/00* (2016.01)
*A47J 47/04* (2006.01)
*B65B 43/10* (2006.01)
*B65D 43/06* (2006.01)
*B65D 43/16* (2006.01)
*B65D 51/20* (2006.01)
*B65D 51/22* (2006.01)
*B65D 59/04* (2006.01)
*B65D 77/04* (2006.01)
*B65D 85/00* (2006.01)

(52) U.S. Cl.
CPC .............. *B65B 43/10* (2013.01); *B65D 43/06* (2013.01); *B65D 43/16* (2013.01); *B65D 51/20* (2013.01); *B65D 51/22* (2013.01); *B65D 59/04* (2013.01); *B65D 77/0433* (2013.01); *B65D 85/70* (2013.01); *A23V 2002/00* (2013.01); *B65D 2251/009* (2013.01); *B65D 2251/0018* (2013.01); *B65D 2251/0021* (2013.01); *B65D 2251/0028* (2013.01); *B65D 2251/0071* (2013.01); *B65D 2251/0093* (2013.01); *B65D 2517/0007* (2013.01); *B65D 2517/0013* (2013.01); *B65D 2565/385* (2013.01)

(58) Field of Classification Search
USPC ......................................................... 220/62.11
See application file for complete search history.

(56) References Cited

U.S. PATENT DOCUMENTS

| 8,042,704 | B2* | 10/2011 | Borowski | ............... A47J 47/01 220/212 |
|---|---|---|---|---|
| 2002/0000445 | A1 | 1/2002 | Nurse | |
| 2008/0041861 | A1 | 2/2008 | Crawford et al. | |
| 2008/0083758 | A1 | 4/2008 | Blendell et al. | |
| 2009/0065467 | A1 | 3/2009 | Heyn | |
| 2011/0220533 | A1* | 9/2011 | Shah | .......................... B32B 1/02 206/524.2 |
| 2012/0205376 | A1* | 8/2012 | Yang | .................... B65D 51/246 220/212 |

FOREIGN PATENT DOCUMENTS

| EP | 0 442 433 A1 | 8/1991 |
|---|---|---|
| GB | 2 300 791 A | 11/1996 |
| WO | 2010/071424 A1 | 6/2010 |
| WO | 2014003542 | 1/2014 |

OTHER PUBLICATIONS

International Search Report, dated Feb. 25, 2014, from corresponding PCT application.
International Preliminary Report on Patentability, dated Feb. 23, 2015, from corresponding PCT application.
Chinese Office Action dated May 25, 2016; Application No. 2013800700553.

* cited by examiner

CONTAINER CONSTRUCTION FOR POWDERED MATERIAL

BACKGROUND OF THE INVENTION

Field of the Invention

The present invention relates to containers for the packaging of powder products, in particular for infant nutrition such as powdered or granulated milk formula. The invention further relates to a package comprising the combination of a container and a quantity of product.

Description of the Related Art

Powdered material, such as infant milk formula, has been sold in various forms of package for many years. Metal cans were initially the preferred container as they were relatively easy and cheap to produce and could be sealed for long term storage. The seal comprised an aluminum foil across the mouth of the container that was removed on first use. As a single container would be used for an extended period, the containers were provided with resealable plastic lids which gripped over the outer rim of the can. A measuring scoop was frequently included with the container, either packaged separately or within the can itself. Compared with modern materials, such cans are now considered relatively expensive and heavy.

More recently, alternative packaging forms have become available which improve on the existing cans. These include plastic and foil laminate container bodies and hinged lid assemblies having a facility to receive and retain a measuring scoop. One such package is described in US 2008041861, the contents of which are hereby incorporated by reference in their entirety. That package has a seal for initially closing the package and a space between the seal and an upper edge of the container for partially receiving the scoop prior to use. The container part may consist of a laminate of paper (board), metal foil and plastic material.

A further similar package is shown in WO2010071424, the contents of which are hereby incorporated by reference in their entirety. The above described package comprises a generally upright container i.e. having a height greater than a width or breadth. Lid designs have attempted to provide a relatively large access opening to the container interior so that a user may easily remove all of the contents with the scoop provided. The container comprises a cardboard wall covered or coated with one or more sealing layers for sealing contents of the container from environmental influences.

The use of such materials is disadvantageous for the recyclability of the containers as separating the layers of the laminates is difficult and tedious work for the user. It would therefore be desirable to provide an alternative container construction that alleviated at least some of the perceived inconveniences of the prior art.

BRIEF SUMMARY OF THE INVENTION

According to the invention there is provided a package for a powdered material comprising a tub for receiving the material, the tub having a base and a peripheral wall with a top edge, an outer sleeve around at least the peripheral wall of the tub, thereby supporting the tub, a removable membrane for separating the powdered material in the tub from the environment, and a lid assembly comprising a peripheral rim for connection over the top edge of the peripheral wall of the tub and defining a wide access opening and a lid, hingedly attached to the rim for reclosing the access opening.

In a preferred embodiment, the peripheral wall of the tub is enclosed by the sleeve around its complete periphery, whereby the sleeve supports the tub and the tub and sleeve together form a composite container for the powdered material. As the outer sleeve gives support to the tub containing the powdered material, the amount of material used for the tub can be reduced. Furthermore, the outer sleeve and the tub can be separated in case these parts are made of different materials, thereby promoting recycling of the packaging.

The membrane is preferably connected to the peripheral wall, thus closing an open top side of the tub. The location of the connection can be either an inside of the peripheral wall at a distance from the top edge, or the top edge of the tub itself. It will however be understood that the membrane may also be provided on the lid assembly, closing the wide access opening in the rim prior to use. In a preferred embodiment of the invention, the membrane is rupturable or frangible and may comprise a weakened tear line defining an opening region, and a pull tab. In this manner, the membrane may be opened without disrupting the connection between the membrane and the top edge or the connection between the membrane and the peripheral wall if such is present. In such cases, a peripheral region of the membrane remains permanently connected at the top edge of the peripheral wall.

The lid is intended to reclose the access opening to prevent escape of product once the membrane has been opened after first use. It should also prevent ingress of moisture, dirt and other foreign objects. In particular the lid and rim should close sufficiently to prevent ingress of small insects and the like. A maximum opening of 70 microns in the closed state is generally considered sufficient to achieve this. It will be understood that by using the membrane as a seal between the lid and the peripheral wall, the connection between the container and the rim will also be closed to at least the same tolerance. It is also noted that although the package is described as being suitable for a powdered material product, it may also be used for other products, not limited to liquids, gels and pasty or viscous products.

Preferably, the tub comprises a single compartment, which compartment holds the powdered product. In order to reach the full content of the package and to allow removal of the product during use, the access opening to the tub should be as large as possible. Preferably, the wide access opening is a rectangular shape, occupying substantially the maximum area of the tub. In addition, the rectangular shape can be combined with rounded corners. Otherwise, an elliptical shape of the access opening is possible as well.

According to an embodiment, the tub comprises an outwardly extending flange at the top edge to which flange the membrane may be connected. By providing an outwardly extending flange along the top edge of the peripheral wall of the tub, a relatively large connection area for the membrane can be achieved. In addition, the outwardly extending flange may be used as a connection element for the lid part of the packaging.

According to an important aspect of the invention, the tub and the sleeve support each other in order to provide a wall structure that is stronger than would be the case for each of the elements when taken alone. In a preferred embodiment, this may be achieved by providing an interference fit between the peripheral wall of the tub and the outer sleeve. This interference fit may prevent them from sliding out of each other during normal use and also can ensure that the peripheral wall of the tub is adequately supported. It will be understood that the weight of the powder contents can assist in pressing the peripheral wall into contact with the outer sleeve. In one embodiment, the interference fit may be provided without additional adhesive or the like. This eases the separation of the two parts of the container upon disposal and decreases the amount of time for manufacturing as the process step of adding adhesive can be omitted. It will however be appreciated that in other embodiments, in particular where an interference fit is absent, adhesive of some form may be desirable e.g. to increase the composite strength of the package. Other mechanical connection between the tub and the outer sleeve may also be provided.

The interference fit may be achieved in various ways. In a preferred embodiment, the tub and the outer sleeve are manufactured to high tolerances, guaranteeing the required fit. This may be achieved when the sleeve has a sleeve base and the peripheral wall and the outer sleeve are slightly tapered whereby a depth of the tub is such that it achieves the interference fit before the base of the tub engages the sleeve base. It will be understood that the sleeve base may be either open or at least partially closed. In particular it may be desirable that the sleeve base supports the underside of the tub base.

Alternatively, the interference fit may be achieved by slightly oversizing the tub relatively to the sleeve, i.e. that the tub is larger than the sleeve. Upon insertion of the tub, the upstanding peripheral wall of the tub will be deformed to fit in the sleeve and upon relaxation, the wall of the tub will exert a force on the peripheral wall of the sleeve, causing the interference fit.

Additionally, the fit may further require that a top edge of the outer sleeve is at a distance different from the top edge of the tub. In order for the outer sleeve to adequately support the inner tub, the top edge of the sleeve does not necessarily have to coincide with the top edge of the tub. When a relatively small distance is maintained between the top edges, the tolerances of the respective heights of the tub and the sleeve can be accommodated such that the support of the sleeve to the tub can be optimized. This relatively small distance may be at most 5.0 mm, preferably 2 mm, more preferably 1 mm, whereby the peripheral wall is supported up to its top edge, without the tub actually being suspended from its top edge. Preferably, the taper of the outer sleeve and/or tub will be between 1° and 7°.

Other ways of achieving or improving the interference fit may involve the use of shrink fit materials for the sleeve, shape memory materials for the tub or may require the tub peripheral wall to be formed of material that will flex outwardly into engagement with the outer sleeve.

Preferably, the outer sleeve comprises a carton material. Carton is a relatively cheap material and is relatively strong such that it can support the inner tub. This is even more preferred in the case where the peripheral wall of the tub is relatively weaker and the outer sleeve is relatively stronger in terms of their flexural modulus, such that the outer sleeve supports the tub. The tub is made of a polymer material, preferably polypropylene (PP) for the sake of easy manufacturing. However, other polymer materials such as polyethylene terephthalate (PET) or polyethylene (PE) can be used as well. Multi layer materials may also be used, subject to the requirements of recycling. Most preferably, the tub comprises a multi-layer laminate including a central barrier layer having reduced oxygen transmission, such as EVOH or the like. The peripheral wall of the tub is preferably formed to have a thickness and strength such that without the outer sleeve it would be too flexible for normal use and stacking. In particular, the peripheral wall may have a strength such that without the outer sleeve it is unable to adequately support a similar full container, whereas a stack of two further containers would collapse. Upon combination of tub and sleeve, the interference fit will provide rigidity and strength to the formed container, such that the lid assembly can be connected to the container and the lid can be reclosed after use, without the risk of the container to collapse. The peripheral walls of the tub and of the sleeve may have a thickness of about 0.10 to 0.50 mm, respectively, preferably between 0.15 and 0.40 mm. The sleeve may comprise carton of 50 to 400 g/m$^2$, preferably 100-300 g/m$^2$.

According to an embodiment, a viewing window in the outer sleeve may be provided, such that when a translucent material for the tub is used, the content of the tub can be seen.

According to one embodiment, the container may have a generally square or rectangular outer profile with rounded corners.

The lid or the rim may also be provided with tamper evident closure indication. These may be otherwise conventional engagement mechanisms between the lid and the rim which must be broken on first time opening of the container and which make such opening and breakage visually evident.

Preferably, the packaging has stacking provisions such that a number of like packages can be stacked on one another. The packaging may be defined to have an upper side which will generally be formed by the peripheral rim and the lid and a lower side being primarily a base of the container, i.e. the combination of tub and outer sleeve. The packaging preferably comprises stacking provisions on or at the upper side and complementary provisions at the base of the packaging. Such provisions may comprise cams, grooves, protrusions, flanges and the like which serve to locate one container with respect to another, in particular by preventing relative lateral movement.

Preferably, the packaging has a width dimension, a depth dimension and a length dimension and at least the length dimension is greater than the depth dimension. Such a low profile container ensures that a user can easily reach with a scoop to the bottom of the container to extract the last of the product. Preferably, a scoop is provided within the package and may be located above the membrane prior to use. Preferably, the container has a generally square or rectangular outer profile with rounded corners. The access opening may also be generally of a similar shape but may be slightly more round or elliptical.

According to a preferred embodiment of the invention, the rim and the lid are integrally formed together of polymeric material. Preferred materials for the lid and rim are polypropylene (PP), polyethylene (PE) and polyethylene terephthalate (PET) or combinations thereof, although the skilled person will be familiar with various alternatives which could provide similar engineering properties. The hinged connection may be formed as a living hinge. An alternative two piece construction may also be envisaged. It is also conceivable that a scoop is integrally formed with the lid construction and separated at first use.

The invention also encompasses a package as described above including a quantity of powdered material sealed within the container, preferably a powdered nutritional product. It will be understood that in this context powdered nutritional product can include powders, granules, pellets and the like and that nutritional product may be given its broadest possible meaning. Nevertheless, the invention is most specifically directed to baby or infant nutritional products such as milk formula.

For use with a powdered nutritional product and, in particular for infant nutrition, particular care must be taken during processing. Thus the package should be filled and sealed in a high-care zone and all element surfaces coming into contact with the nutritional product should only be exposed to the high-care zone. For the purpose of the present invention, high-care is intended to denote that the environment is at an over-pressure with respect to atmospheric pressure, preferably an overpressure of between 5 and 50 Pa, more preferably an overpressure of between 5 and 30 Pa, most preferably between 5 and 20 Pa. The temperature in the high-care zone is preferably kept between 18 and 25° C., more preferably between 19 and 23° C. and the relative humidity is preferably controlled between 20 and 80% RH, more preferably between 30 and 60% RH, most preferably between 35 and 50% RH. Also, the atmosphere within the high-care environment is preferably filtered to remove particulates, such as with a HEPA (High-efficiency particulate absorption) filter including a H10 filter or higher according to EN 1822:2009. Preferably, all components entering into contact with the product are cleaned by sterile, ionized air jet and checked with a vision system for imperfections or foreign bodies. Furthermore, the package is filled in a low-oxygen atmosphere. This may include flushing with nitrogen or carbon dioxide before and during the filling procedure and prior to applying the membrane.

As opposed to the high-are zone, other steps, not including the filling and sealing of the tub with the nutritional product, may be performed in a low-care zone. For the purpose of the present invention, low-care is intended to denote that the environment thereof is kept at ambient conditions. This includes ambient pressure, meaning no overpressure situation is created. Also, the temperature in the low-care zone is preferably less strictly controlled compared to the high-care conditions, meaning that the temperature in the low-care can be between 12 and 30° C., more preferably 15 and 26° C. Particulate filtration may be installed in the low-care area or installed for flow of air into the low-care zone but HEPA filtration is preferably not implemented to save costs.

According to a still further aspect of the invention there is also disclosed a method of manufacturing a package for a powdered material, comprising:
 providing a tub for receiving the powdered material, the tub having a base and a peripheral wall with a top edge;
 providing a lid assembly, comprising a peripheral rim defining a wide access opening, and a lid, hingedly attached to the rim for reclosing the access opening;
 filling the tub with the powdered material;
 sliding the tub in a sleeve, such that at least the peripheral wall of the tub is enclosed by the sleeve, whereby sleeve supports the tub and the tub and sleeve form a container for the powdered material;
 providing a membrane for separating the powdered material from the environment, the membrane having an opening region and a peripheral region, separated from each other by a line of weakness;
 sealing the membrane to the peripheral wall of the tub; and
 connecting the peripheral rim of the lid assembly over the top edge of the tub.

The container is constructed from an inner tub that holds the powdered product. The tub is slid into the sleeve to form the container and to give support to the relatively thin tub. The manufacturing steps may be in the sequence as described above, although first sliding the tub into the sleeve and then filling the tub is another possibility as well. However, filling the tub with the powdered material prior to sliding into the sleeve is preferred, as the product provides additional support to the peripheral wall of the tub. Additionally, the contents of the tub exert an outward force to the sleeve, thereby promoting an interference fit between the tub and the sleeve. In addition, the membrane can be provided over the top edge of the tub before sliding the tub into the sleeve to give extra support to the tub.

According to an embodiment, the method comprises connecting the peripheral rim of the lid assembly over the top edge with a mechanical connection, i.e. form fitting.

In one particular form of the method the peripheral wall of the container is formed by thermoforming or blow-moulding.

BRIEF DESCRIPTION OF THE DRAWINGS

The features and advantages of the invention will be appreciated upon reference to the following drawings of a number of exemplary embodiments, in which.

DESCRIPTION OF ILLUSTRATIVE EMBODIMENTS

Figure 1:
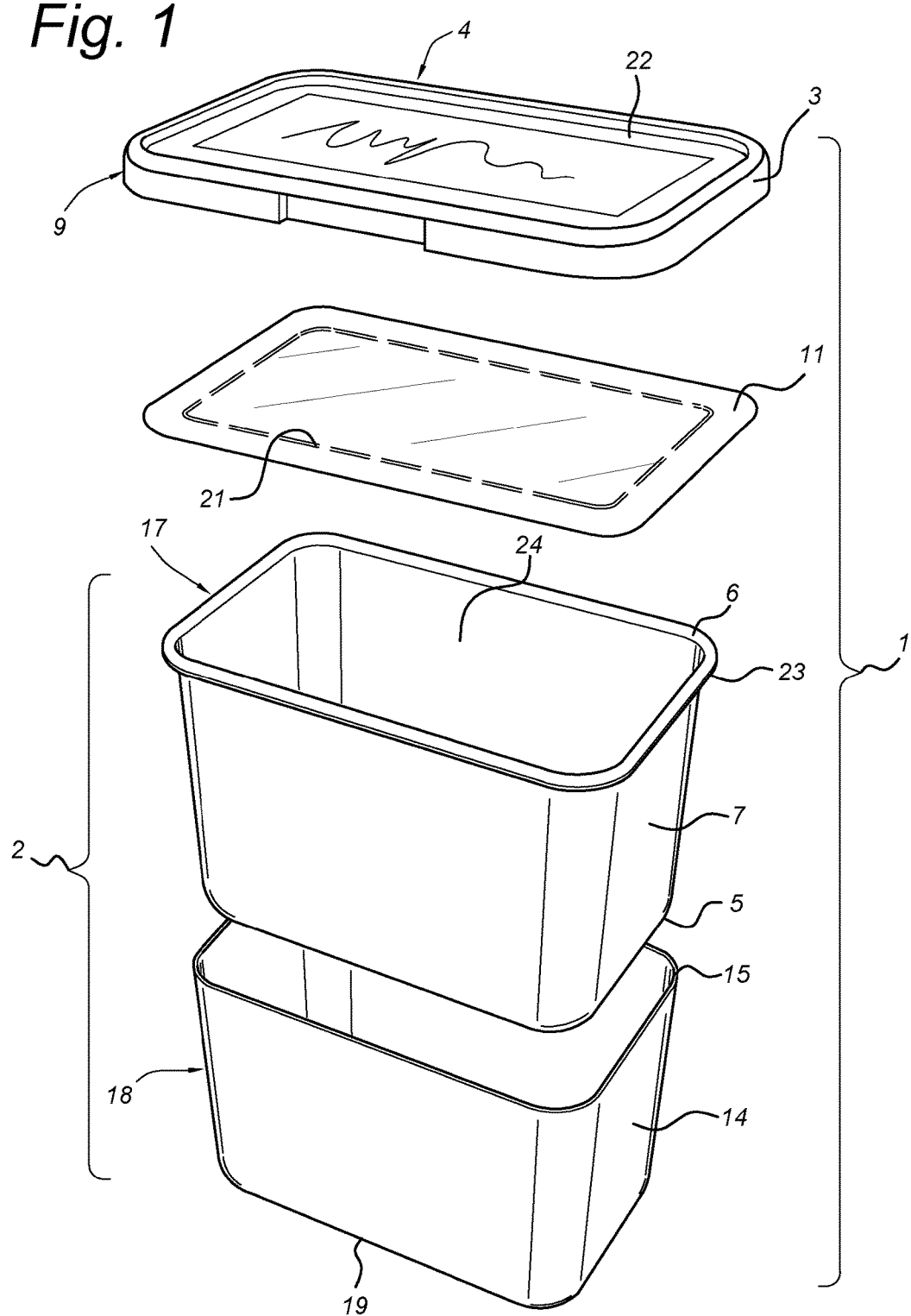
FIG. 1 shows a package according to a first embodiment of the present invention in partly exploded perspective view.

FIG. 1 shows a partially exploded view of a package 1 according to a first embodiment of the invention comprising a container 2 and a lid assembly 9. The lid assembly 9 comprises a circumferential rim 3 for connecting the lid assembly 9 to the container 2 and a lid 4 for reclosing the container 2 after opening. The container 2 comprises a tub 17 and a sleeve 18. The tub 17 has a base 5 and a peripheral upstanding wall 7 having a top edge 6. The top edge 6 of the tub 17 comprises a flange 23 that extends outwardly from the peripheral wall. A membrane 11 is connected to the top edge 6 of the tub 17 at the flange 23 for sealing the powdered product (not shown) from the environment. The sleeve 18 has a further base 19 and a further peripheral upstanding wall 14 with a further top edge 15. Alternatively, the sleeve 18 can comprise only a further peripheral wall, leaving the base 5 of the tub 17 uncovered. The tub 17 has only one compartment 24, which compartment holds the product (not shown).

In this view it can be seen that the sleeve 18 of carton is provided around the tub 17 of polymer material. The sleeve 18 provides rigidity to the tub 17 and can be easily printed as may be required. The tub 17 and the sleeve 18 support each other in order to provide a wall structure that is stronger than would be the case for each of the elements when taken alone. This support is achieved by an interference fit preventing the tub 17 and the sleeve 18 from sliding out of each other during normal use and ensures that the peripheral wall 7 of the tub 17 is adequately supported. The weight of the powder contents (not shown) can assist in pressing the peripheral wall 7 of the tub 17 into contact with the outer sleeve 18. The peripheral rim 3 fits over the top edge 6 of the tub 17. The peripheral rim 3 and the top edge 6 define an access opening 8. The access opening 8 is sealed with a membrane 11 prior to use. The lid 4 and peripheral rim 3 are arranged to attach onto flange 23 to complete the package 1. To this end, the peripheral rim 3 fits over the flange 23. During manufacture, the tub 17 may first be filled with milk powder (not shown). The membrane 11 may then be connected to the top edge 6 to form a hermetically sealed unit.

In a final stage of production, the outer sleeve 18 may be slid over the tub, the sleeve having the desired printing, and the lid assembly 9 may be applied. However, first sliding the sleeve 18 over the tub 17 before conducting the further manufacturing steps is possible as well. The tub 17 is then subsequently sealed with the membrane 11 over the top edge 6 and the lid assembly 9 is subsequently applied onto the top edge 6 at the flange 23.

Figure 2:
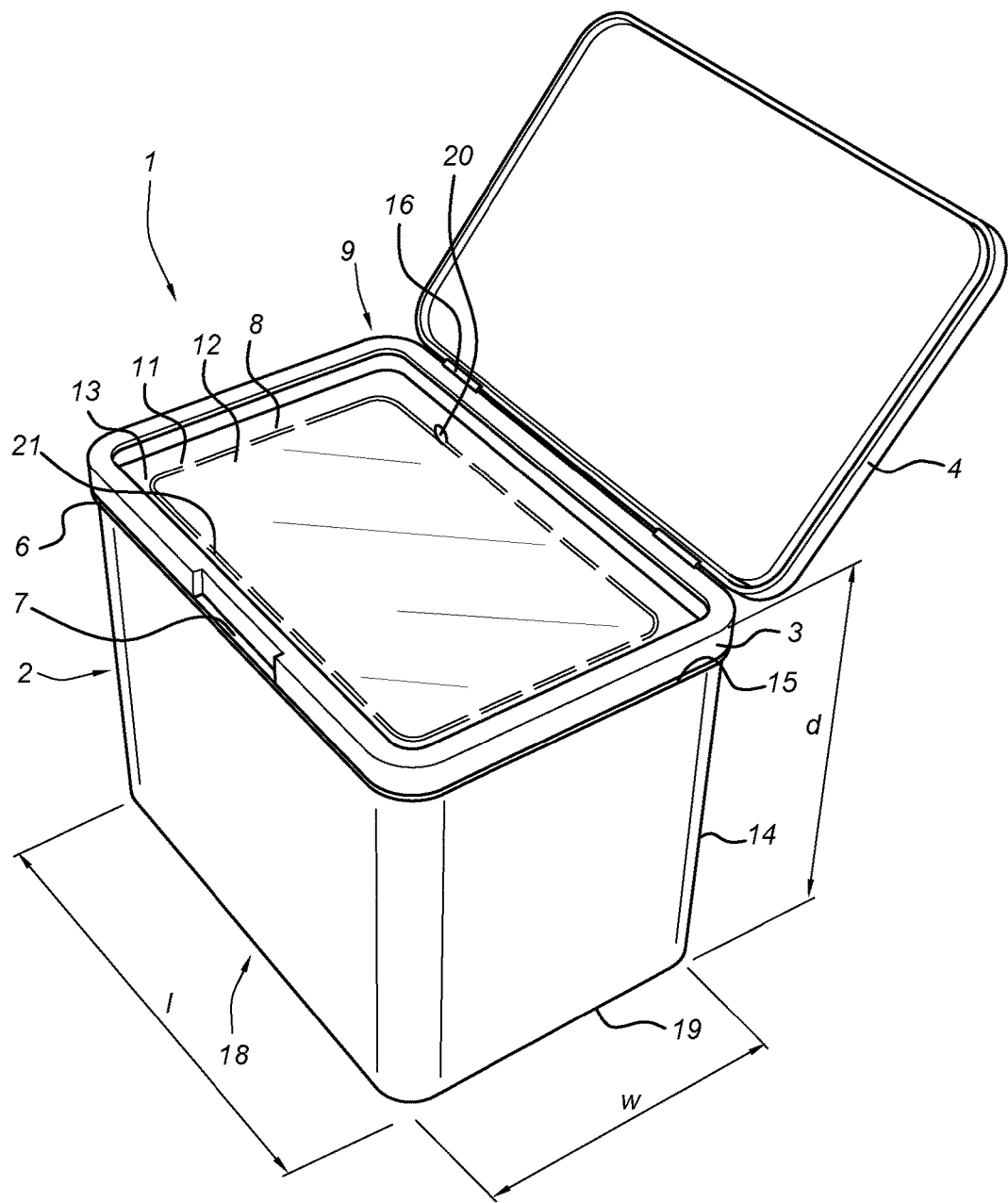
FIG. 2 shows a perspective view of the embodiment of FIG. 1.

FIG. 2 shows the embodiment of FIG. 1 in perspective view. The container 2 has a depth dimension d, measured from its base 5 to a top edge 6 of its peripheral wall 7. It also has a width dimension w and a length dimension 1. The rim 3 forms an access opening 8 providing access to the interior of the container 2. During manufacture, the inner tub 17 is slid into the outer sleeve 18 forming the container 2. The inner tub 17 is then supported by the outer sleeve 18. The top edge 6 of the tub 17 and the top edge 15 of the outer sleeve are at a distance from each other, such that the tolerances in the height dimensions of these container parts may be accommodated. The membrane 11 has a weakening line 21 and a pull tab 20 that may be grasped in order to facilitate its removal along the weakening line 21. As can be seen, the tear line 21 delimits the peripheral region 13 which remains attached to peripheral wall 7 once the central opening region 12 has been removed by pulling of the pull-tab 20. In use, the package 1 is opened by hinging back the lid 4 along hinges 16 to reveal the access opening 8. The pull tab 20 may then be grasped in order to rupture the membrane 11 along the line of weakness 21. The opening region 12 may then be removed, leaving a peripheral region 13 connected to the peripheral wall 7 and exposing the powdered material (not shown). A scoop (not shown) is used to perform dosing of the powdered material. After use of the product, the lid 4 is reclosed.

In the embodiment of FIGS. 1 and 2, the base of the container 2 has a profile (not shown) that is complementary to the depression 22 on the lid. During storage or display, packages 1 may be stacked one upon the other whereby the base 5, 19 of one package 1 engages with the lid 4 of a package 1 beneath. On use, the user removes the membrane 11 and uses a scoop to dispense product. The lid 4 subsequently serves to close the access opening 8.

The invention claimed is:

1. Packaging for powdered infant milk formula material comprising:
   a thermoformed tub for receiving the infant milk formula material, the tub having a base and a peripheral wall of polymeric material with a top edge, the peripheral wall having a thickness between 0.1 mm and 0.5 mm and being provided with a barrier layer having reduced oxygen transmission, the peripheral wall being flexible;
   an outer carton sleeve enclosing the peripheral wall of the tub around its complete periphery, thereby engaging and supporting the peripheral wall of the tub and engaging and supporting at least a part of the base of the tub with a base of the sleeve;
   a removable membrane for separating the powdered infant milk formula material in the tub from the environment; and
   a lid assembly comprising a peripheral rim for connection over the top edge of the peripheral wall of the tub and defining a wide access opening and a lid, hingedly attached to the rim for reclosing the access opening and powdered infant milk formula filling the tub such that the powdered infant milk formula exerts an outward force on the peripheral wall flexing the peripheral wall towards the sleeve.

2. The packaging according to claim 1, wherein the tub comprises a single product containing compartment.

3. The packaging according to claim 1, wherein a further top edge of the outer sleeve is at a distance from the top edge of the tub.

4. The packaging according to claim 1, wherein the wide access opening is a rectangular shape.

5. The packaging according to claim 1, wherein the tub engages the outer sleeve with an interference fit.

6. The packaging according to claim 1, wherein the membrane comprises a weakened tear line defining an opening region, and a pull tab.

7. The packaging according to claim 1, wherein the rim and the lid are integrally formed of polymeric material.

8. The packaging according to claim 1, wherein the polymeric material of the peripheral wall of the tub is a laminate comprising polypropylene.

9. The packaging according to claim 1, wherein the outer sleeve has a flexural modulus that is higher than a flexural modulus of the peripheral wall of the tub, such that the outer sleeve supports the tub.

10. The packaging according to claim 1, wherein the lid or the rim are provided with a tamper evident closure indication.

11. The packaging of claim 1, wherein the powdered infant milk formula is sealed within the container.

12. The packaging of claim 1, wherein said outer carton sleeve is comprised of carton of 50 to 400 g/m$^2$.

13. The packaging of claim 1, wherein said outer carton sleeve is comprised of carton of 100 to 300 g/m$^2$.

14. The packaging of claim 1, wherein said outer carton sleeve is comprised of carton of 50 to 400 g/m$^2$.

15. The packaging according to claim 1, and further comprising adhesive connecting an outside of the tub and an inside of the sleeve such that it increases the composite strength.

16. The packaging according to claim 1, wherein the sleeve and the tub together form a composite container for the powdered material.

17. The packaging according to claim 1, wherein the flexing of the peripheral wall towards the sleeve results in the peripheral wall connecting to the sleeve.

18. A method of manufacturing a package for a powdered infant milk formula, the method comprising:
   providing a thermoformed tub for receiving the powdered infant milk formula, the tub having a base and a peripheral wall of polymeric material with a top edge, the peripheral wall being flexible;
   providing a lid assembly, comprising a peripheral rim defining a wide access opening and a lid, hingedly attached to the rim for reclosing the access opening;
   filling the tub with the powdered infant milk formula such that the powdered infant milk formula exerts an outward force on the peripheral wall flexing the peripheral wall;
   placing a carton sleeve around the tub, such that at least the peripheral wall of the tub is enclosed around its complete periphery by the sleeve, whereby the sleeve engages and supports the peripheral wall of the tub which flexes outwardly toward the sleeve and engages and supports at least a part of the base of the tub with a base of the sleeve, and the tub and sleeve together form a container for the powdered infant milk formula;
   providing a membrane for separating the powdered infant milk formula from the environment, the membrane having an opening region and a peripheral region, separated from each other by a line of weakness;

sealing the membrane to the peripheral wall of the tub; and connecting the peripheral rim of the lid assembly over the top edge of the tub.

19. The method according to claim 18, wherein the tub is filled with the powdered infant milk formula prior to placing the sleeve around the tub.

20. A packaging for powdered infant milk formula material comprising:

a thermoformed tub for receiving the infant milk formula material, the tub having a base and a peripheral wall of polymeric material with a top edge, the peripheral wall being flexible, having a thickness between 0.1 mm and 0.5 mm and being provided with a barrier layer having reduced oxygen transmission;

an outer carton sleeve enclosing the peripheral wall of the tub around its complete periphery and terminating at the base, thereby engaging and supporting the peripheral wall and at least a portion of the base of the tub with a base of the sleeve;

a removable membrane for separating the powdered infant milk formula material in the tub from the environment; and a lid assembly comprising a peripheral rim for connection over the top edge of the peripheral wall of the tub and defining a wide access opening and a lid, hingedly attached to the rim for reclosing the access opening, and powdered infant milk formula filling the tub such that the powdered infant milk formula exerts an outward force on the peripheral wall flexing the peripheral wall towards the sleeve.

* * * * *